(12) United States Patent
Meir

(10) Patent No.: US 9,104,580 B1
(45) Date of Patent: Aug. 11, 2015

(54) CACHE MEMORY FOR HYBRID DISK DRIVES

(75) Inventor: Avraham Meir, Rishon Le-Zion (IL)

(73) Assignee: Apple Inc., Cupertino, CA (US)

( * ) Notice: Subject to any disclaimer, the term of this patent is extended or adjusted under 35 U.S.C. 154(b) by 384 days.

(21) Appl. No.: 13/069,406

(22) Filed: Mar. 23, 2011

Related U.S. Application Data

(60) Provisional application No. 61/367,894, filed on Jul. 27, 2010.

(51) Int. Cl.
*G06F 12/00* (2006.01)
*G06F 12/02* (2006.01)
*G06F 12/08* (2006.01)

(52) U.S. Cl.
CPC ........ *G06F 12/0871* (2013.01); *G06F 12/0246* (2013.01); *G06F 12/0848* (2013.01); *G06F 12/0864* (2013.01); *G06F 12/0866* (2013.01)

(58) Field of Classification Search
CPC .. G06F 12/00; G06F 12/0246; G06F 12/0871
USPC .................................. 711/103, E12.008, 170
See application file for complete search history.

(56) References Cited

U.S. PATENT DOCUMENTS

| | | | |
|---|---|---|---|
| 3,668,631 A | 6/1972 | Griffith et al. | |
| 3,668,632 A | 6/1972 | Oldham | |
| 4,058,851 A | 11/1977 | Scheuneman | |
| 4,112,502 A | 9/1978 | Scheuneman | |
| 4,394,763 A | 7/1983 | Nagano et al. | |
| 4,413,339 A | 11/1983 | Riggle et al. | |
| 4,556,961 A | 12/1985 | Iwahashi et al. | |
| 4,558,431 A | 12/1985 | Satoh | |
| 4,608,687 A | 8/1986 | Dutton | |
| 4,654,847 A | 3/1987 | Dutton | |
| 4,661,929 A | 4/1987 | Aoki et al. | |
| 4,768,171 A | 8/1988 | Tada | |
| 4,811,285 A | 3/1989 | Walker et al. | |
| 4,899,342 A | 2/1990 | Potter et al. | |
| 4,910,706 A | 3/1990 | Hyatt | |
| 4,993,029 A | 2/1991 | Galbraith et al. | |
| 5,056,089 A | 10/1991 | Furuta et al. | |

(Continued)

FOREIGN PATENT DOCUMENTS

| | | |
|---|---|---|
| EP | 0783754 B1 | 1/1997 |
| EP | 1434236 B1 | 6/2004 |

(Continued)

OTHER PUBLICATIONS

U.S. Appl. No. 12/323,544 Office Action dated Dec. 13, 2011.

(Continued)

*Primary Examiner* — Aimee Li
*Assistant Examiner* — Kenneth Tsang
(74) *Attorney, Agent, or Firm* — Meyertons, Hood, Kivlin, Kowert & Goetzel, P.C.

(57) ABSTRACT

A method for data storage in a data storage system, which includes a main storage device and a non-volatile memory, includes assessing quality levels of respective memory blocks of the non-volatile memory. One or more of the memory blocks whose assessed quality levels are lower than a pre-defined quality threshold are identified. The identified memory blocks are assigned to serve as read cache memory. Data is read from the main storage device via the read cache memory, including the assigned memory blocks.

13 Claims, 1 Drawing Sheet

(56) References Cited

U.S. PATENT DOCUMENTS

| | | |
|---|---|---|
| 5,077,722 A | 12/1991 | Geist et al. |
| 5,126,808 A | 6/1992 | Montalvo et al. |
| 5,163,021 A | 11/1992 | Mehrotra et al. |
| 5,172,338 A | 12/1992 | Mehrotra et al. |
| 5,182,558 A | 1/1993 | Mayo |
| 5,182,752 A | 1/1993 | DeRoo et al. |
| 5,191,584 A | 3/1993 | Anderson |
| 5,200,959 A | 4/1993 | Gross et al. |
| 5,237,535 A | 8/1993 | Mielke et al. |
| 5,272,669 A | 12/1993 | Samachisa et al. |
| 5,276,649 A | 1/1994 | Hoshita et al. |
| 5,287,469 A | 2/1994 | Tsuboi |
| 5,365,484 A | 11/1994 | Cleveland et al. |
| 5,388,064 A | 2/1995 | Khan |
| 5,402,380 A * | 3/1995 | Kumakura et al. ...... 365/185.08 |
| 5,416,646 A | 5/1995 | Shirai |
| 5,416,782 A | 5/1995 | Wells et al. |
| 5,446,854 A | 8/1995 | Khalidi et al. |
| 5,450,424 A | 9/1995 | Okugaki et al. |
| 5,469,444 A | 11/1995 | Endoh et al. |
| 5,473,753 A | 12/1995 | Wells et al. |
| 5,479,170 A | 12/1995 | Cauwenberghs et al. |
| 5,508,958 A | 4/1996 | Fazio et al. |
| 5,519,831 A | 5/1996 | Holzhammer |
| 5,532,962 A | 7/1996 | Auclair et al. |
| 5,533,190 A | 7/1996 | Binford et al. |
| 5,541,886 A | 7/1996 | Hasbun |
| 5,600,677 A | 2/1997 | Citta et al. |
| 5,638,320 A | 6/1997 | Wong et al. |
| 5,657,332 A | 8/1997 | Auclair et al. |
| 5,675,540 A | 10/1997 | Roohparvar |
| 5,682,352 A | 10/1997 | Wong et al. |
| 5,687,114 A | 11/1997 | Khan |
| 5,696,717 A | 12/1997 | Koh |
| 5,726,649 A | 3/1998 | Tamaru et al. |
| 5,726,934 A | 3/1998 | Tran et al. |
| 5,742,752 A | 4/1998 | De Koening |
| 5,748,533 A | 5/1998 | Dunlap et al. |
| 5,748,534 A | 5/1998 | Dunlap et al. |
| 5,751,637 A | 5/1998 | Chen et al. |
| 5,761,402 A | 6/1998 | Kaneda et al. |
| 5,798,966 A | 8/1998 | Keeney |
| 5,799,200 A | 8/1998 | Brant et al. |
| 5,801,985 A | 9/1998 | Roohparvar et al. |
| 5,838,832 A | 11/1998 | Barnsley |
| 5,860,106 A | 1/1999 | Domen et al. |
| 5,867,114 A | 2/1999 | Barbir |
| 5,867,428 A | 2/1999 | Ishii et al. |
| 5,867,429 A | 2/1999 | Chen et al. |
| 5,877,986 A | 3/1999 | Harari et al. |
| 5,889,937 A | 3/1999 | Tamagawa |
| 5,901,089 A | 5/1999 | Korsh et al. |
| 5,909,449 A | 6/1999 | So et al. |
| 5,912,906 A | 6/1999 | Wu et al. |
| 5,930,167 A * | 7/1999 | Lee et al. ................. 365/185.03 |
| 5,937,424 A | 8/1999 | Leak et al. |
| 5,942,004 A | 8/1999 | Cappelletti |
| 5,946,716 A | 8/1999 | Karp et al. |
| 5,969,986 A | 10/1999 | Wong et al. |
| 5,982,668 A | 11/1999 | Ishii et al. |
| 5,991,517 A | 11/1999 | Harari et al. |
| 5,995,417 A | 11/1999 | Chen et al. |
| 6,009,014 A | 12/1999 | Hollmer et al. |
| 6,009,016 A | 12/1999 | Ishii et al. |
| 6,016,275 A * | 1/2000 | Han ........................ 365/185.29 |
| 6,023,425 A | 2/2000 | Ishii et al. |
| 6,034,891 A | 3/2000 | Norman |
| 6,040,993 A | 3/2000 | Chen et al. |
| 6,041,430 A | 3/2000 | Yamauchi |
| 6,073,204 A | 6/2000 | Lakhani et al. |
| 6,101,614 A | 8/2000 | Gonzales et al. |
| 6,128,237 A | 10/2000 | Shirley et al. |
| 6,134,140 A | 10/2000 | Tanaka et al. |
| 6,134,143 A | 10/2000 | Norman |
| 6,134,631 A | 10/2000 | Jennings |
| 6,141,261 A | 10/2000 | Patti |
| 6,151,246 A | 11/2000 | So et al. |
| 6,157,573 A | 12/2000 | Ishii et al. |
| 6,166,962 A | 12/2000 | Chen et al. |
| 6,169,691 B1 | 1/2001 | Pasotti et al. |
| 6,178,466 B1 | 1/2001 | Gilbertson et al. |
| 6,185,134 B1 | 2/2001 | Tanaka et al. |
| 6,209,113 B1 | 3/2001 | Roohparvar |
| 6,212,654 B1 | 4/2001 | Lou et al. |
| 6,219,276 B1 | 4/2001 | Parker |
| 6,219,447 B1 | 4/2001 | Lee et al. |
| 6,222,762 B1 | 4/2001 | Guterman et al. |
| 6,230,233 B1 | 5/2001 | Lofgren et al. |
| 6,240,458 B1 | 5/2001 | Gilbertson |
| 6,259,627 B1 | 7/2001 | Wong |
| 6,275,419 B1 | 8/2001 | Guterman et al. |
| 6,278,632 B1 | 8/2001 | Chevallier |
| 6,279,069 B1 | 8/2001 | Robinson et al. |
| 6,288,944 B1 | 9/2001 | Kawamura |
| 6,292,394 B1 | 9/2001 | Cohen et al. |
| 6,301,151 B1 | 10/2001 | Engh et al. |
| 6,304,486 B1 | 10/2001 | Yano |
| 6,307,776 B1 | 10/2001 | So et al. |
| 6,314,044 B1 | 11/2001 | Sasaki et al. |
| 6,317,363 B1 | 11/2001 | Guterman et al. |
| 6,317,364 B1 | 11/2001 | Guterman et al. |
| 6,345,004 B1 | 2/2002 | Omura et al. |
| 6,360,346 B1 | 3/2002 | Miyauchi et al. |
| 6,363,008 B1 | 3/2002 | Wong |
| 6,363,454 B1 | 3/2002 | Lakhani et al. |
| 6,366,496 B1 | 4/2002 | Torelli et al. |
| 6,385,092 B1 | 5/2002 | Ishii et al. |
| 6,392,932 B1 | 5/2002 | Ishii et al. |
| 6,396,742 B1 | 5/2002 | Korsh et al. |
| 6,397,364 B1 | 5/2002 | Barkan |
| 6,405,323 B1 | 6/2002 | Lin et al. |
| 6,405,342 B1 | 6/2002 | Lee |
| 6,418,060 B1 | 7/2002 | Yong et al. |
| 6,442,585 B1 | 8/2002 | Dean et al. |
| 6,445,602 B1 | 9/2002 | Kokudo et al. |
| 6,452,838 B1 | 9/2002 | Ishii et al. |
| 6,456,528 B1 | 9/2002 | Chen |
| 6,466,476 B1 | 10/2002 | Wong et al. |
| 6,467,062 B1 | 10/2002 | Barkan |
| 6,469,931 B1 | 10/2002 | Ban et al. |
| 6,480,948 B1 | 11/2002 | Virajpet et al. |
| 6,490,236 B1 | 12/2002 | Fukuda et al. |
| 6,522,580 B2 | 2/2003 | Chen et al. |
| 6,525,952 B2 | 2/2003 | Araki et al. |
| 6,532,556 B1 | 3/2003 | Wong et al. |
| 6,538,922 B1 | 3/2003 | Khalid et al. |
| 6,549,464 B2 | 4/2003 | Tanaka et al. |
| 6,553,510 B1 | 4/2003 | Pekny et al. |
| 6,558,967 B1 | 5/2003 | Wong |
| 6,560,152 B1 | 5/2003 | Cernea |
| 6,567,311 B2 | 5/2003 | Ishii et al. |
| 6,577,539 B2 | 6/2003 | Iwahashi |
| 6,584,012 B2 | 6/2003 | Banks |
| 6,615,307 B1 | 9/2003 | Roohparvar |
| 6,621,739 B2 | 9/2003 | Gonzalez et al. |
| 6,640,326 B1 | 10/2003 | Buckingham et al. |
| 6,643,169 B2 | 11/2003 | Rudelic et al. |
| 6,646,913 B2 | 11/2003 | Micheloni et al. |
| 6,678,192 B2 | 1/2004 | Gongwer et al. |
| 6,683,811 B2 | 1/2004 | Ishii et al. |
| 6,687,155 B2 | 2/2004 | Nagasue |
| 6,707,748 B2 | 3/2004 | Lin et al. |
| 6,708,257 B2 | 3/2004 | Bao |
| 6,714,449 B2 | 3/2004 | Khalid |
| 6,717,847 B2 | 4/2004 | Chen |
| 6,731,557 B2 | 5/2004 | Beretta |
| 6,732,250 B2 | 5/2004 | Durrant |
| 6,738,293 B1 | 5/2004 | Iwahashi |
| 6,751,766 B2 | 6/2004 | Guterman et al. |
| 6,757,193 B2 | 6/2004 | Chen et al. |
| 6,774,808 B1 | 8/2004 | Hibbs et al. |
| 6,781,877 B2 | 8/2004 | Cernea et al. |
| 6,804,805 B2 | 10/2004 | Rub |
| 6,807,095 B2 | 10/2004 | Chen et al. |

(56) References Cited

U.S. PATENT DOCUMENTS

| | | | |
|---|---|---|---|
| 6,807,101 B2 | 10/2004 | Ooishi et al. |
| 6,809,964 B2 | 10/2004 | Moschopoulos et al. |
| 6,819,592 B2 | 11/2004 | Noguchi et al. |
| 6,829,167 B2 | 12/2004 | Tu et al. |
| 6,845,052 B1 | 1/2005 | Ho et al. |
| 6,851,018 B2 | 2/2005 | Wyatt et al. |
| 6,851,081 B2 | 2/2005 | Yamamoto |
| 6,856,546 B2 | 2/2005 | Guterman et al. |
| 6,862,218 B2 | 3/2005 | Guterman et al. |
| 6,870,767 B2 | 3/2005 | Rudelic et al. |
| 6,870,773 B2 | 3/2005 | Noguchi et al. |
| 6,873,552 B2 | 3/2005 | Ishii et al. |
| 6,879,520 B2 | 4/2005 | Hosono et al. |
| 6,882,567 B1 | 4/2005 | Wong |
| 6,894,926 B2 | 5/2005 | Guterman et al. |
| 6,907,497 B2 | 6/2005 | Hosono et al. |
| 6,925,009 B2 | 8/2005 | Noguchi et al. |
| 6,930,925 B2 | 8/2005 | Guo et al. |
| 6,934,188 B2 | 8/2005 | Roohparvar |
| 6,937,511 B2 | 8/2005 | Hsu et al. |
| 6,958,938 B2 | 10/2005 | Noguchi et al. |
| 6,963,505 B2 | 11/2005 | Cohen |
| 6,972,993 B2 | 12/2005 | Conley et al. |
| 6,988,175 B2 | 1/2006 | Lasser |
| 6,992,932 B2 | 1/2006 | Cohen |
| 6,999,344 B2 | 2/2006 | Hosono et al. |
| 7,002,843 B2 | 2/2006 | Guterman et al. |
| 7,006,379 B2 | 2/2006 | Noguchi et al. |
| 7,012,835 B2 | 3/2006 | Gonzalez et al. |
| 7,020,017 B2 | 3/2006 | Chen et al. |
| 7,023,735 B2 | 4/2006 | Ban et al. |
| 7,031,210 B2 | 4/2006 | Park et al. |
| 7,031,214 B2 | 4/2006 | Tran |
| 7,031,216 B2 | 4/2006 | You |
| 7,039,846 B2 | 5/2006 | Hewitt et al. |
| 7,042,766 B1 | 5/2006 | Wang et al. |
| 7,054,193 B1 | 5/2006 | Wong |
| 7,054,199 B2 | 5/2006 | Lee et al. |
| 7,057,958 B2 | 6/2006 | So et al. |
| 7,065,147 B2 | 6/2006 | Ophir et al. |
| 7,068,539 B2 | 6/2006 | Guterman et al. |
| 7,071,849 B2 | 7/2006 | Zhang |
| 7,072,222 B2 | 7/2006 | Ishii et al. |
| 7,079,555 B2 | 7/2006 | Baydar et al. |
| 7,088,615 B2 | 8/2006 | Guterman et al. |
| 7,099,194 B2 | 8/2006 | Tu et al. |
| 7,102,924 B2 | 9/2006 | Chen et al. |
| 7,113,432 B2 | 9/2006 | Mokhlesi |
| 7,130,210 B2 | 10/2006 | Bathul et al. |
| 7,139,192 B1 | 11/2006 | Wong |
| 7,139,198 B2 | 11/2006 | Guterman et al. |
| 7,145,805 B2 | 12/2006 | Ishii et al. |
| 7,151,692 B2 | 12/2006 | Wu |
| 7,158,058 B1 | 1/2007 | Yu |
| 7,170,781 B2 | 1/2007 | So et al. |
| 7,170,802 B2 | 1/2007 | Cernea et al. |
| 7,173,859 B2 | 2/2007 | Hemink |
| 7,177,184 B2 | 2/2007 | Chen |
| 7,177,195 B2 | 2/2007 | Gonzalez et al. |
| 7,177,199 B2 | 2/2007 | Chen et al. |
| 7,177,200 B2 | 2/2007 | Ronen et al. |
| 7,184,338 B2 | 2/2007 | Nagakawa et al. |
| 7,187,195 B2 | 3/2007 | Kim |
| 7,187,592 B2 | 3/2007 | Guterman et al. |
| 7,190,614 B2 | 3/2007 | Wu |
| 7,193,898 B2 | 3/2007 | Cernea |
| 7,193,921 B2 | 3/2007 | Choi et al. |
| 7,196,644 B1 | 3/2007 | Anderson et al. |
| 7,196,928 B2 | 3/2007 | Chen |
| 7,196,933 B2 | 3/2007 | Shibata |
| 7,197,594 B2 | 3/2007 | Raz et al. |
| 7,200,062 B2 | 4/2007 | Kinsely et al. |
| 7,210,077 B2 | 4/2007 | Brandenberger et al. |
| 7,221,592 B2 | 5/2007 | Nazarian |
| 7,224,613 B2 | 5/2007 | Chen et al. |
| 7,231,474 B1 | 6/2007 | Helms et al. |
| 7,231,562 B2 | 6/2007 | Ohlhoff et al. |
| 7,243,275 B2 | 7/2007 | Gongwer et al. |
| 7,254,690 B2 | 8/2007 | Rao |
| 7,254,763 B2 | 8/2007 | Aadsen et al. |
| 7,257,027 B2 | 8/2007 | Park |
| 7,259,987 B2 | 8/2007 | Chen et al. |
| 7,266,026 B2 | 9/2007 | Gongwer et al. |
| 7,266,069 B2 | 9/2007 | Chu |
| 7,269,066 B2 | 9/2007 | Nguyen et al. |
| 7,272,757 B2 | 9/2007 | Stocken |
| 7,274,611 B2 | 9/2007 | Roohparvar |
| 7,277,355 B2 | 10/2007 | Tanzana |
| 7,280,398 B1 | 10/2007 | Lee et al. |
| 7,280,409 B2 | 10/2007 | Misumi et al. |
| 7,280,415 B2 | 10/2007 | Hwang et al. |
| 7,283,399 B2 | 10/2007 | Ishii et al. |
| 7,289,344 B2 | 10/2007 | Chen |
| 7,301,807 B2 | 11/2007 | Khalid et al. |
| 7,301,817 B2 | 11/2007 | Li et al. |
| 7,308,525 B2 | 12/2007 | Lasser et al. |
| 7,310,255 B2 | 12/2007 | Chan |
| 7,310,269 B2 | 12/2007 | Shibata |
| 7,310,271 B2 | 12/2007 | Lee |
| 7,310,272 B1 | 12/2007 | Mokhesi et al. |
| 7,310,347 B2 | 12/2007 | Lasser |
| 7,312,727 B1 | 12/2007 | Feng et al. |
| 7,321,509 B2 | 1/2008 | Chen et al. |
| 7,328,384 B1 | 2/2008 | Kulkarni et al. |
| 7,340,593 B2 | 3/2008 | Martin |
| 7,342,831 B2 | 3/2008 | Mokhlesi et al. |
| 7,343,330 B1 | 3/2008 | Boesjes et al. |
| 7,345,924 B2 | 3/2008 | Nguyen et al. |
| 7,345,928 B2 | 3/2008 | Li |
| 7,349,263 B2 | 3/2008 | Kim et al. |
| 7,356,755 B2 | 4/2008 | Fackenthal |
| 7,363,420 B2 | 4/2008 | Lin et al. |
| 7,365,671 B1 | 4/2008 | Anderson |
| 7,388,781 B2 | 6/2008 | Litsyn et al. |
| 7,397,697 B2 | 7/2008 | So et al. |
| 7,405,974 B2 | 7/2008 | Yaoi et al. |
| 7,405,979 B2 | 7/2008 | Ishii et al. |
| 7,408,804 B2 | 8/2008 | Hemink et al. |
| 7,408,810 B2 | 8/2008 | Aritome et al. |
| 7,409,473 B2 | 8/2008 | Conley et al. |
| 7,409,623 B2 | 8/2008 | Baker et al. |
| 7,420,847 B2 | 9/2008 | Li |
| 7,433,231 B2 | 10/2008 | Aritome |
| 7,433,697 B2 | 10/2008 | Karaoguz et al. |
| 7,434,111 B2 | 10/2008 | Sugiura et al. |
| 7,437,498 B2 | 10/2008 | Ronen |
| 7,440,324 B2 | 10/2008 | Mokhlesi |
| 7,440,331 B2 | 10/2008 | Hemink |
| 7,441,067 B2 | 10/2008 | Gorobets et al. |
| 7,447,970 B2 | 11/2008 | Wu et al. |
| 7,450,421 B2 | 11/2008 | Mokhlesi et al. |
| 7,453,737 B2 | 11/2008 | Ha |
| 7,457,163 B2 | 11/2008 | Hemink |
| 7,457,897 B1 | 11/2008 | Lee et al. |
| 7,460,410 B2 | 12/2008 | Nagai et al. |
| 7,460,412 B2 | 12/2008 | Lee et al. |
| 7,466,592 B2 | 12/2008 | Mitani et al. |
| 7,468,907 B2 | 12/2008 | Kang et al. |
| 7,468,911 B2 | 12/2008 | Lutze et al. |
| 7,469,049 B1 | 12/2008 | Feng |
| 7,471,581 B2 | 12/2008 | Tran et al. |
| 7,483,319 B2 | 1/2009 | Brown |
| 7,487,329 B2 | 2/2009 | Hepkin et al. |
| 7,487,394 B2 | 2/2009 | Forhan et al. |
| 7,492,641 B2 | 2/2009 | Hosono et al. |
| 7,508,710 B2 | 3/2009 | Mokhlesi |
| 7,526,711 B2 | 4/2009 | Orio |
| 7,539,061 B2 | 5/2009 | Lee |
| 7,539,062 B2 | 5/2009 | Doyle |
| 7,551,492 B2 | 6/2009 | Kim |
| 7,558,109 B2 | 7/2009 | Brandman et al. |
| 7,558,839 B1 | 7/2009 | McGovern |
| 7,568,135 B2 | 7/2009 | Cornwell et al. |
| 7,570,520 B2 | 8/2009 | Kamei et al. |

(56) References Cited

U.S. PATENT DOCUMENTS

| | | |
|---|---|---|
| 7,574,555 B2 | 8/2009 | Porat et al. |
| 7,590,002 B2 | 9/2009 | Mokhlesi et al. |
| 7,593,259 B2 | 9/2009 | Kim |
| 7,594,093 B1 | 9/2009 | Kancherla |
| 7,596,707 B1 | 9/2009 | Vemula |
| 7,609,787 B2 | 10/2009 | Jahan et al. |
| 7,613,043 B2 | 11/2009 | Cornwell et al. |
| 7,616,498 B2 | 11/2009 | Mokhlesi et al. |
| 7,619,918 B2 | 11/2009 | Aritome |
| 7,631,245 B2 | 12/2009 | Lasser |
| 7,633,798 B2 | 12/2009 | Sarin et al. |
| 7,633,802 B2 | 12/2009 | Mokhlesi |
| 7,639,532 B2 | 12/2009 | Roohparvar et al. |
| 7,644,347 B2 | 1/2010 | Alexander et al. |
| 7,656,734 B2 | 2/2010 | Thorp et al. |
| 7,660,158 B2 | 2/2010 | Aritome |
| 7,660,183 B2 | 2/2010 | Ware et al. |
| 7,661,000 B2 | 2/2010 | Ueda et al. |
| 7,661,054 B2 | 2/2010 | Huffman et al. |
| 7,665,007 B2 | 2/2010 | Yang et al. |
| 7,680,987 B1 | 3/2010 | Clark et al. |
| 7,733,712 B1 | 6/2010 | Walston et al. |
| 7,742,351 B2 | 6/2010 | Inoue et al. |
| 7,761,624 B2 | 7/2010 | Karamcheti et al. |
| 7,797,609 B2 | 9/2010 | Neuman |
| 7,810,017 B2 | 10/2010 | Radke |
| 7,848,149 B2 | 12/2010 | Gonzalez et al. |
| 7,869,273 B2 | 1/2011 | Lee et al. |
| 7,885,119 B2 | 2/2011 | Li |
| 7,904,783 B2 | 3/2011 | Brandman et al. |
| 7,928,497 B2 | 4/2011 | Yaegashi |
| 7,929,549 B1 | 4/2011 | Talbot |
| 7,930,515 B2 | 4/2011 | Gupta et al. |
| 7,945,825 B2 | 5/2011 | Cohen et al. |
| 7,978,516 B2 | 7/2011 | Olbrich et al. |
| 8,014,094 B1 | 9/2011 | Jin |
| 8,037,380 B2 | 10/2011 | Cagno et al. |
| 8,040,744 B2 | 10/2011 | Gorobets et al. |
| 8,065,583 B2 | 11/2011 | Radke |
| 8,195,878 B2 | 6/2012 | Mittendorff |
| 8,407,398 B2 | 3/2013 | Hobbet |
| 2001/0002172 A1 | 5/2001 | Tanaka et al. |
| 2001/0006479 A1 | 7/2001 | Ikehashi et al. |
| 2002/0038440 A1 | 3/2002 | Barkan |
| 2002/0056064 A1 | 5/2002 | Kidorf et al. |
| 2002/0118574 A1 | 8/2002 | Gongwer et al. |
| 2002/0133684 A1 | 9/2002 | Anderson |
| 2002/0166091 A1 | 11/2002 | Kidorf et al. |
| 2002/0174295 A1 | 11/2002 | Ulrich et al. |
| 2002/0196510 A1 | 12/2002 | Hietala et al. |
| 2003/0002348 A1 | 1/2003 | Chen et al. |
| 2003/0103400 A1 | 6/2003 | Van Tran |
| 2003/0161183 A1 | 8/2003 | Tran |
| 2003/0189856 A1 | 10/2003 | Cho et al. |
| 2004/0057265 A1 | 3/2004 | Mirabel et al. |
| 2004/0057285 A1 | 3/2004 | Cernea et al. |
| 2004/0083333 A1 | 4/2004 | Chang et al. |
| 2004/0083334 A1 | 4/2004 | Chang et al. |
| 2004/0105311 A1 | 6/2004 | Cernea et al. |
| 2004/0114437 A1 | 6/2004 | Li |
| 2004/0160842 A1 | 8/2004 | Fukiage |
| 2004/0205296 A1* | 10/2004 | Bearden ......... 711/129 |
| 2004/0223371 A1 | 11/2004 | Roohparvar |
| 2005/0007802 A1 | 1/2005 | Gerpheide |
| 2005/0013165 A1 | 1/2005 | Ban |
| 2005/0024941 A1 | 2/2005 | Lasser et al. |
| 2005/0024978 A1 | 2/2005 | Ronen |
| 2005/0030788 A1 | 2/2005 | Parkinson et al. |
| 2005/0086574 A1 | 4/2005 | Fackenthal |
| 2005/0121436 A1 | 6/2005 | Kamitani et al. |
| 2005/0144361 A1 | 6/2005 | Gonzalez et al. |
| 2005/0157555 A1 | 7/2005 | Ono et al. |
| 2005/0162913 A1 | 7/2005 | Chen |
| 2005/0169051 A1 | 8/2005 | Khalid et al. |
| 2005/0189649 A1 | 9/2005 | Maruyama et al. |
| 2005/0213393 A1 | 9/2005 | Lasser |
| 2005/0224853 A1 | 10/2005 | Ohkawa |
| 2005/0235124 A1* | 10/2005 | Pomaranski et al. ......... 711/170 |
| 2005/0240745 A1 | 10/2005 | Iyer et al. |
| 2005/0243626 A1 | 11/2005 | Ronen |
| 2006/0004952 A1 | 1/2006 | Lasser |
| 2006/0028875 A1 | 2/2006 | Avraham et al. |
| 2006/0028877 A1 | 2/2006 | Meir |
| 2006/0101193 A1 | 5/2006 | Murin |
| 2006/0106972 A1 | 5/2006 | Gorobets et al. |
| 2006/0107136 A1 | 5/2006 | Gongwer et al. |
| 2006/0129750 A1 | 6/2006 | Lee et al. |
| 2006/0133141 A1 | 6/2006 | Gorobets |
| 2006/0156189 A1 | 7/2006 | Tomlin |
| 2006/0179334 A1 | 8/2006 | Brittain et al. |
| 2006/0190699 A1 | 8/2006 | Lee |
| 2006/0203546 A1 | 9/2006 | Lasser |
| 2006/0218359 A1 | 9/2006 | Sanders et al. |
| 2006/0221692 A1 | 10/2006 | Chen |
| 2006/0221705 A1 | 10/2006 | Hemink et al. |
| 2006/0221714 A1 | 10/2006 | Li et al. |
| 2006/0239077 A1 | 10/2006 | Park et al. |
| 2006/0239081 A1 | 10/2006 | Roohparvar |
| 2006/0249585 A1* | 11/2006 | Hammerschmitt et al. .. 235/492 |
| 2006/0256620 A1 | 11/2006 | Nguyen et al. |
| 2006/0256626 A1 | 11/2006 | Werner et al. |
| 2006/0256891 A1 | 11/2006 | Yuan et al. |
| 2006/0271748 A1 | 11/2006 | Jain et al. |
| 2006/0285392 A1 | 12/2006 | Incarnati et al. |
| 2006/0285396 A1 | 12/2006 | Ha |
| 2007/0006013 A1 | 1/2007 | Moshayedi et al. |
| 2007/0019481 A1 | 1/2007 | Park |
| 2007/0033581 A1 | 2/2007 | Tomlin et al. |
| 2007/0047314 A1 | 3/2007 | Goda et al. |
| 2007/0047326 A1 | 3/2007 | Nguyen et al. |
| 2007/0050536 A1 | 3/2007 | Kolokowsky |
| 2007/0058446 A1 | 3/2007 | Hwang et al. |
| 2007/0061502 A1 | 3/2007 | Lasser et al. |
| 2007/0067667 A1 | 3/2007 | Ikeuchi et al. |
| 2007/0074093 A1 | 3/2007 | Lasser |
| 2007/0086239 A1 | 4/2007 | Litsyn et al. |
| 2007/0086260 A1 | 4/2007 | Sinclair |
| 2007/0089034 A1 | 4/2007 | Litsyn et al. |
| 2007/0091677 A1 | 4/2007 | Lasser et al. |
| 2007/0091694 A1 | 4/2007 | Lee et al. |
| 2007/0103978 A1 | 5/2007 | Conley et al. |
| 2007/0103986 A1 | 5/2007 | Chen |
| 2007/0104211 A1 | 5/2007 | Opsasnick |
| 2007/0109845 A1 | 5/2007 | Chen |
| 2007/0109849 A1 | 5/2007 | Chen |
| 2007/0115726 A1 | 5/2007 | Cohen et al. |
| 2007/0118713 A1 | 5/2007 | Guterman et al. |
| 2007/0143378 A1 | 6/2007 | Gorobets |
| 2007/0143531 A1 | 6/2007 | Atri |
| 2007/0159889 A1 | 7/2007 | Kang et al. |
| 2007/0159892 A1 | 7/2007 | Kang et al. |
| 2007/0159907 A1 | 7/2007 | Kwak |
| 2007/0168837 A1 | 7/2007 | Murin |
| 2007/0171714 A1 | 7/2007 | Wu et al. |
| 2007/0183210 A1 | 8/2007 | Choi et al. |
| 2007/0189073 A1 | 8/2007 | Aritome |
| 2007/0195602 A1 | 8/2007 | Fong et al. |
| 2007/0206426 A1 | 9/2007 | Mokhlesi |
| 2007/0208904 A1 | 9/2007 | Hsieh et al. |
| 2007/0226599 A1 | 9/2007 | Motwani |
| 2007/0236990 A1 | 10/2007 | Aritome |
| 2007/0253249 A1 | 11/2007 | Kang et al. |
| 2007/0256620 A1 | 11/2007 | Viggiano et al. |
| 2007/0263455 A1 | 11/2007 | Cornwell et al. |
| 2007/0266232 A1 | 11/2007 | Rodgers et al. |
| 2007/0266276 A1* | 11/2007 | Gatzemeier et al. ......... 714/718 |
| 2007/0271424 A1 | 11/2007 | Lee et al. |
| 2007/0280000 A1 | 12/2007 | Fujiu et al. |
| 2007/0291571 A1 | 12/2007 | Balasundaram |
| 2007/0297234 A1 | 12/2007 | Cernea et al. |
| 2008/0010395 A1 | 1/2008 | Mylly et al. |
| 2008/0025121 A1 | 1/2008 | Tanzawa |
| 2008/0043535 A1 | 2/2008 | Roohparvar |
| 2008/0049504 A1 | 2/2008 | Kasahara et al. |

(56) References Cited

U.S. PATENT DOCUMENTS

| | | |
|---|---|---|
| 2008/0049506 A1 | 2/2008 | Guterman |
| 2008/0052446 A1 | 2/2008 | Lasser et al. |
| 2008/0055993 A1 | 3/2008 | Lee |
| 2008/0080243 A1 | 4/2008 | Edahiro et al. |
| 2008/0082730 A1 | 4/2008 | Kim et al. |
| 2008/0089123 A1 | 4/2008 | Chae et al. |
| 2008/0104309 A1 | 5/2008 | Cheon et al. |
| 2008/0104312 A1 | 5/2008 | Lasser |
| 2008/0109590 A1 | 5/2008 | Jung et al. |
| 2008/0115017 A1 | 5/2008 | Jacobson |
| 2008/0123420 A1 | 5/2008 | Brandman et al. |
| 2008/0123426 A1 | 5/2008 | Lutze et al. |
| 2008/0126686 A1 | 5/2008 | Sokolov et al. |
| 2008/0130341 A1 | 6/2008 | Shalvi et al. |
| 2008/0148115 A1 | 6/2008 | Sokolov et al. |
| 2008/0151618 A1 | 6/2008 | Sharon et al. |
| 2008/0151667 A1 | 6/2008 | Miu et al. |
| 2008/0158958 A1 | 7/2008 | Sokolov et al. |
| 2008/0181001 A1 | 7/2008 | Shalvi |
| 2008/0198650 A1 | 8/2008 | Shalvi et al. |
| 2008/0198654 A1 | 8/2008 | Toda |
| 2008/0209116 A1 | 8/2008 | Caulkins |
| 2008/0209304 A1 | 8/2008 | Winarski et al. |
| 2008/0215798 A1 | 9/2008 | Sharon et al. |
| 2008/0219050 A1 | 9/2008 | Shalvi et al. |
| 2008/0239093 A1 | 10/2008 | Easwar et al. |
| 2008/0239812 A1 | 10/2008 | Abiko et al. |
| 2008/0253188 A1 | 10/2008 | Aritome |
| 2008/0263262 A1 | 10/2008 | Sokolov et al. |
| 2008/0263676 A1 | 10/2008 | Mo et al. |
| 2008/0270730 A1 | 10/2008 | Lasser et al. |
| 2008/0282106 A1 | 11/2008 | Shalvi et al. |
| 2008/0288714 A1 | 11/2008 | Salomon et al. |
| 2009/0013233 A1 | 1/2009 | Radke |
| 2009/0024905 A1 | 1/2009 | Shalvi et al. |
| 2009/0034337 A1 | 2/2009 | Aritome |
| 2009/0043831 A1 | 2/2009 | Antonopoulos et al. |
| 2009/0043951 A1 | 2/2009 | Shalvi et al. |
| 2009/0049234 A1 | 2/2009 | Oh et al. |
| 2009/0073762 A1 | 3/2009 | Lee et al. |
| 2009/0086542 A1 | 4/2009 | Lee et al. |
| 2009/0089484 A1 | 4/2009 | Chu |
| 2009/0091979 A1 | 4/2009 | Shalvi |
| 2009/0094930 A1 | 4/2009 | Schwoerer |
| 2009/0106485 A1 | 4/2009 | Anholt |
| 2009/0112949 A1 | 4/2009 | Ergan et al. |
| 2009/0132755 A1 | 5/2009 | Radke |
| 2009/0144600 A1 | 6/2009 | Perlmutter et al. |
| 2009/0150894 A1 | 6/2009 | Huang et al. |
| 2009/0157950 A1 | 6/2009 | Selinger |
| 2009/0157964 A1 | 6/2009 | Kasorla et al. |
| 2009/0158126 A1 | 6/2009 | Perlmutter et al. |
| 2009/0161466 A1* | 6/2009 | Hamilton et al. ............. 365/222 |
| 2009/0168524 A1 | 7/2009 | Golov et al. |
| 2009/0172257 A1 | 7/2009 | Prins et al. |
| 2009/0172261 A1 | 7/2009 | Prins et al. |
| 2009/0193184 A1 | 7/2009 | Yu et al. |
| 2009/0193301 A1* | 7/2009 | Ito et al. .................... 714/704 |
| 2009/0199074 A1 | 8/2009 | Sommer et al. |
| 2009/0204824 A1 | 8/2009 | Lin et al. |
| 2009/0204852 A1* | 8/2009 | Diggs et al. ..................... 714/42 |
| 2009/0204872 A1 | 8/2009 | Yu et al. |
| 2009/0213653 A1 | 8/2009 | Perlmutter et al. |
| 2009/0213654 A1 | 8/2009 | Perlmutter et al. |
| 2009/0225595 A1 | 9/2009 | Kim |
| 2009/0228761 A1 | 9/2009 | Perlmutter et al. |
| 2009/0240872 A1 | 9/2009 | Perlmutter et al. |
| 2009/0259896 A1* | 10/2009 | Hsu et al. .................... 714/723 |
| 2009/0265509 A1 | 10/2009 | Klein |
| 2009/0300227 A1 | 12/2009 | Nochimowski et al. |
| 2009/0319825 A1* | 12/2009 | Yang et al. ..................... 714/5 |
| 2009/0323412 A1 | 12/2009 | Mokhlesi et al. |
| 2009/0327608 A1 | 12/2009 | Eschmann |
| 2010/0017650 A1 | 1/2010 | Chin et al. |
| 2010/0027343 A1* | 2/2010 | Teggatz et al. ........... 365/185.18 |
| 2010/0034022 A1 | 2/2010 | Dutta et al. |
| 2010/0057976 A1 | 3/2010 | Lasser |
| 2010/0061151 A1 | 3/2010 | Miwa et al. |
| 2010/0082883 A1 | 4/2010 | Chen et al. |
| 2010/0083247 A1 | 4/2010 | Kanevsky et al. |
| 2010/0110580 A1 | 5/2010 | Takashima |
| 2010/0115197 A1* | 5/2010 | Lee et al. ...................... 711/113 |
| 2010/0124088 A1 | 5/2010 | Shalvi et al. |
| 2010/0131697 A1 | 5/2010 | Alrod et al. |
| 2010/0131827 A1 | 5/2010 | Sokolov et al. |
| 2010/0142268 A1 | 6/2010 | Aritome |
| 2010/0142277 A1 | 6/2010 | Yang et al. |
| 2010/0157675 A1 | 6/2010 | Shalvi et al. |
| 2010/0165689 A1* | 7/2010 | Rotbard et al. ................. 365/45 |
| 2010/0169547 A1 | 7/2010 | Ou |
| 2010/0169743 A1 | 7/2010 | Vogan et al. |
| 2010/0174847 A1 | 7/2010 | Paley et al. |
| 2010/0195390 A1 | 8/2010 | Shalvi |
| 2010/0199150 A1 | 8/2010 | Shalvi et al. |
| 2010/0211803 A1 | 8/2010 | Lablans |
| 2010/0220509 A1 | 9/2010 | Sokolov et al. |
| 2010/0220510 A1 | 9/2010 | Shalvi |
| 2010/0250836 A1 | 9/2010 | Sokolov et al. |
| 2010/0287217 A1 | 11/2010 | Borchers et al. |
| 2010/0306577 A1* | 12/2010 | Dreifus et al. ..................... 714/6 |
| 2010/0306582 A1* | 12/2010 | Han et al. ......................... 714/8 |
| 2011/0010489 A1 | 1/2011 | Yeh |
| 2011/0047437 A1* | 2/2011 | Flynn ............................ 714/758 |
| 2011/0055397 A1* | 3/2011 | Dehaan ........................ 709/226 |
| 2011/0060969 A1 | 3/2011 | Ramamoorthy et al. |
| 2011/0066793 A1 | 3/2011 | Burd |
| 2011/0075482 A1 | 3/2011 | Shepard et al. |
| 2011/0099418 A1* | 4/2011 | Chen ........................... 714/6.24 |
| 2011/0107049 A1 | 5/2011 | Kwon et al. |
| 2011/0138106 A1* | 6/2011 | Prabhakaran et al. ......... 711/103 |
| 2011/0149657 A1 | 6/2011 | Haratsch et al. |
| 2011/0199823 A1 | 8/2011 | Bar-Or et al. |
| 2011/0252289 A1* | 10/2011 | Patapoutian et al. ......... 714/763 |
| 2011/0302354 A1 | 12/2011 | Miller |
| 2012/0096225 A1* | 4/2012 | Khawand et al. ............. 711/119 |
| 2012/0117304 A1* | 5/2012 | Worthington et al. ........ 711/103 |

FOREIGN PATENT DOCUMENTS

| | | |
|---|---|---|
| EP | 1605509 A1 | 12/2005 |
| WO | 9610256 A1 | 4/1996 |
| WO | 9828745 A1 | 7/1998 |
| WO | 02100112 A1 | 12/2002 |
| WO | 03100791 A1 | 12/2003 |
| WO | 2007046084 A2 | 4/2007 |
| WO | 2007132452 A2 | 11/2007 |
| WO | 2007132453 A2 | 11/2007 |
| WO | 2007132456 A2 | 11/2007 |
| WO | 2007132457 A2 | 11/2007 |
| WO | 2007132458 A2 | 11/2007 |
| WO | 2007146010 A2 | 12/2007 |
| WO | 2008026203 A2 | 3/2008 |
| WO | 2008053472 A2 | 5/2008 |
| WO | 2008053473 A2 | 5/2008 |
| WO | 2008068747 A2 | 6/2008 |
| WO | 2008077284 A1 | 7/2008 |
| WO | 2008083131 A2 | 7/2008 |
| WO | 2008099958 A1 | 8/2008 |
| WO | 2008111058 A2 | 9/2008 |
| WO | 2008124760 A2 | 10/2008 |
| WO | 2008139441 A2 | 11/2008 |
| WO | 2009037691 A2 | 3/2009 |
| WO | 2009037697 A2 | 3/2009 |
| WO | 2009038961 A2 | 3/2009 |
| WO | 2009050703 A2 | 4/2009 |
| WO | 2009053961 A2 | 4/2009 |
| WO | 2009053962 A2 | 4/2009 |
| WO | 2009053963 A2 | 4/2009 |
| WO | 2009063450 A2 | 5/2009 |
| WO | 2009072100 A2 | 6/2009 |
| WO | 2009072101 A2 | 6/2009 |
| WO | 2009072102 A2 | 6/2009 |
| WO | 2009072103 A2 | 6/2009 |
| WO | 2009072104 A2 | 6/2009 |

(56) References Cited

FOREIGN PATENT DOCUMENTS

| WO | 2009072105 A2 | 6/2009 |
|----|---------------|--------|
| WO | 2009074978 A2 | 6/2009 |
| WO | 2009074979 A2 | 6/2009 |
| WO | 2009078006 A2 | 6/2009 |
| WO | 2009095902 A2 | 8/2009 |
| WO | 2011024015 A1 | 3/2011 |

OTHER PUBLICATIONS

U.S. Appl. No. 12/332,368 Office Action dated Nov. 10, 2011.
U.S. Appl. No. 12/063,544 Office Action dated Dec. 14, 2011.
U.S. Appl. No. 12/186,867 Office Action dated Jan. 17, 2012.
U.S. Appl. No. 12/119,069 Office Action dated Nov. 14, 2011.
U.S. Appl. No. 12/037,487 Office Action dated Jan. 3, 2012.
U.S. Appl. No. 11/995,812 Office Action dated Oct. 28, 2011.
U.S. Appl. No. 12/551,567 Office Action dated Oct. 27, 2011.
U.S. Appl. No. 12/618,732 Office Action dated Nov. 4, 2011.
U.S. Appl. No. 12/649,382 Office Action dated Jan. 6, 2012.
U.S. Appl. No. 13/284,909, filed Oct. 30, 2011.
U.S. Appl. No. 13/284,913, filed Oct. 30, 2011.
U.S. Appl. No. 13/338,335, filed Dec. 28, 2011.
U.S. Appl. No. 13/355,536, filed Jan. 22, 2012.
Kim et al., "Multi-bit Error Tolerant Caches Using Two-Dimensional Error Coding", Proceedings of the 40th Annual ACM/IEEE International Symposium on Microarchitecture (MICRO-40), Chicago, USA, Dec. 1-5, 2007.
U.S. Appl. No. 12/323,544 Official Action dated Mar. 9, 2012.
Chinese Patent Application # 200780026181.3 Official Action dated Mar. 7, 2012.
Chinese Patent Application # 200780026094.8 Official Action dated Feb. 2, 2012.
U.S. Appl. No. 12/332,370 Official Action dated Mar. 8, 2012.
U.S. Appl. No. 12/579,432 Official Action dated Feb. 29, 2012.
U.S. Appl. No. 12/522,175 Official Action dated Mar. 27, 2012.
U.S. Appl. No. 12/607,085 Official Action dated Mar. 28, 2012.
Budilovsky et al., "Prototyping a High-Performance Low-Cost Solid-State Disk", SYSTOR—The 4th Annual International Systems and Storage Conference, Haifa, Israel, May 30-Jun. 1, 2011.
NVM Express Protocol, "NVM Express", Revision 1.0b, Jul. 12, 2011.
SCSI Protocol, "Information Technology—SCSI Architecture Model—5 (SAM-5)", INCITS document T10/2104-D, revision 01, Jan. 28, 2009.
SAS Protocol, "Information Technology—Serial Attached SCSI-2 (SAS-2)", INCITS document T10/1760-D, revision 15a, Feb. 22, 2009.
Agrell et al., "Closest Point Search in Lattices", IEEE Transactions on Information Theory, vol. 48, No. 8, pp. 2201-2214, Aug. 2002.
Bez et al., "Introduction to Flash memory", Proceedings of the IEEE, vol. 91, No. 4, pp. 489-502, Apr. 2003.
Blahut, R. E., "Theory and Practice of Error Control Codes," Addison-Wesley, May 1984, section 3.2, pp. 47-48.
Chang, L., "Hybrid Solid State Disks: Combining Heterogeneous NAND Flash in Large SSDs", ASPDAC, Jan. 2008.
Cho et al., "Multi-Level NAND Flash Memory with Non-Uniform Threshold Voltage Distribution," IEEE International Solid-State Circuits Conference (ISSCC), San Francisco, CA, Feb. 5-7, 2001, pp. 28-29 and 424.
Compaq et al., "Universal Serial Bus Specification", revision 2.0, Apr. 27, 2000.
Databahn™, "Flash memory controller IP", Denali Software, Inc., 1994 https://www.denali.com/en/products/databahn_flash.jsp.
Datalight, Inc., "FlashFX Pro 3.1 High Performance Flash Manager for Rapid Development of Reliable Products", Nov. 16, 2006.
Duann, N., Silicon Motion Presentation "SLC & MLC Hybrid", Flash Memory Summit, Santa Clara, USA, Aug. 2008.
Eitan et al., "Can NROM, a 2-bit, Trapping Storage NVM Cell, Give a Real Challenge to Floating Gate Cells?", Proceedings of the 1999 International Conference on Solid State Devices and Materials (SSDM), pp. 522-524, Tokyo, Japan 1999.
Eitan et al., "Multilevel Flash Cells and their Trade-Offs", Proceedings of the 1996 IEEE International Electron Devices Meeting (IEDM), pp. 169-172, New York, USA 1996.
Engh et al., "A self adaptive programming method with 5 mV accuracy for multi-level storage in FLASH", pp. 115-118, Proceedings of the IEEE 2002 Custom Integrated Circuits Conference, May 12-15, 2002.
Engineering Windows 7, "Support and Q&A for Solid-State Drives", e7blog, May 5, 2009.
Goodman et al., "On-Chip ECC for Multi-Level Random Access Memories," Proceedings of the IEEE/CAM Information Theory Workshop, Ithaca, USA, Jun. 25-29, 1989.
Gotou, H., "An Experimental Confirmation of Automatic Threshold Voltage Convergence in a Flash Memory Using Alternating Word-Line Voltage Pulses", IEEE Electron Device Letters, vol. 18, No. 10, pp. 503-505, Oct. 1997.
Han et al., "An Intelligent Garbage Collection Algorithm for Flash Memory Storages", Computational Science and Its Applications—ICCSA 2006, vol. 3980/2006, pp. 1019-1027, Springer Berlin / Heidelberg, Germany, May 11, 2006.
Han et al., "CATA: A Garbage Collection Scheme for Flash Memory File Systems", Ubiquitous Intelligence and Computing, vol. 4159/2006, pp. 103-112, Springer Berlin / Heidelberg, Aug. 25, 2006.
Hong et al., "NAND Flash-based Disk Cache Using SLC/MLC Combined Flash Memory", 2010 International Workshop on Storage Network Architecture and Parallel I/Os, pp. 21-30, USA, May 3, 2010.
Horstein, "On the Design of Signals for Sequential and Nonsequential Detection Systems with Feedback," IEEE Transactions on Information Theory IT-12:4 (Oct. 1966), pp. 448-455.
How to Resolve Bad Super Block: Magic Number Wrong" in BSD", Free Online Articles Director Article Base, posted Sep. 5, 2009.
Huffman, A., "Non-Volatile Memory Host Controller Interface (NVMHCI)", Specification 1.0, Apr. 14, 2008.
Jedec Standard JESD84-C44, "Embedded MultiMediaCard (eMMC) Mechanical Standard, with Optional Reset Signal", Jedec Solid State Technology Association, USA, Jul. 2009.
Jedec, "UFS Specification", version 0.1, Nov. 11, 2009.
Jung et al., in "A 117 mm.sup.2 3.3V Only 128 Mb Multilevel NAND Flash Memory for Mass Storage Applications," IEEE Journal of Solid State Circuits, (11.31), Nov. 1996, pp. 1575-1583.
Kang et al., "A Superblock-based Flash Translation Layer for NAND Flash Memory", Proceedings of the 6th ACM & IEEE International Conference on Embedded Software, pp. 161-170, Seoul, Korea, Oct. 22-26, 2006.
Kawaguchi et al. 1995. A flash-memory based file system. In Proceedings of the USENIX 1995 Technical Conference, New Orleans, Louisiana. 155-164.
Kim et al., "Future Memory Technology including Emerging New Memories", Proceedings of the 24th International Conference on Microelectronics (MIEL), vol. 1, pp. 377-384, Nis, Serbia and Montenegro, May 16-19, 2004.
Lee et al., "Effects of Floating Gate Interference on NAND Flash Memory Cell Operation", IEEE Electron Device Letters, vol. 23, No. 5, pp. 264-266, May 2002.
Maayan et al., "A 512 Mb NROM Flash Data Storage Memory with 8 MB/s Data Rate", Proceedings of the 2002 IEEE International Solid-State circuits Conference (ISSCC 2002), pp. 100-101, San Francisco, USA, Feb. 3-7, 2002.
Mielke et al., "Recovery Effects in the Distributed Cycling of Flash Memories", IEEE 44th Annual International Reliability Physics Symposium, pp. 29-35, San Jose, USA, Mar. 2006.
Micron Technology Inc., "Memory Management in NAND Flash Arrays", Technical Note, year 2005.
Numonyx, "M25PE16: 16-Mbit, page-erasable serial flash memory with byte-alterability, 75 MHz SPI bus, standard pinout", Apr. 2008.
Onfi, "Open NAND Flash Interface Specification," revision 1.0, Dec. 28, 2006.
Panchbhai et al., "Improving Reliability of NAND Based Flash Memory Using Hybrid SLC/MLC Device", Project Proposal for CSci 8980—Advanced Storage Systems, University of Minnesota, USA, Spring 2009.

(56) References Cited

OTHER PUBLICATIONS

Park et al., "Sub-Grouped Superblock Management for High-Performance Flash Storages", IEICE Electronics Express, vol. 6, No. 6, pp. 297-303, Mar. 25, 2009.
Phison Electronics Corporation, "PS8000 Controller Specification (for SD Card)", revision 1.2, Document No. S-07018, Mar. 28, 2007.
Shalvi, et al., "Signal Codes," Proceedings of the 2003 IEEE Information Theory Workshop (ITW'2003), Paris, France, Mar. 31-Apr. 4, 2003.
SD Group and SD Card Association, "SD Specifications Part 1 Physical Layer Specification", version 3.01, draft 1.00, Nov. 9, 2009.
Serial ATA International Organization, "Serial ATA Revision 3.0 Specification", Jun. 2, 2009.
Shiozaki, A., "Adaptive Type-II Hybrid Broadcast ARQ System", IEEE Transactions on Communications, vol. 44, Issue 4, pp. 420-422, Apr. 1996.
Suh et al., "A 3.3V 32Mb NAND Flash Memory with Incremental Step Pulse Programming Scheme", IEEE Journal of Solid-State Circuits, vol. 30, No. 11, pp. 1149-1156, Nov. 1995.
ST Microelectronics, "Bad Block Management in NAND Flash Memories", Application note AN-1819, Geneva, Switzerland, May 2004.
ST Microelectronics, "Wear Leveling in Single Level Cell NAND Flash Memories," Application note AN-1822 Geneva, Switzerland, Feb. 2007.
Super User Forums, "SD Card Failure, can't read superblock", posted Aug. 8, 2010.
Takeuchi et al., "A Double Level $V_{TH}$ Select Gate Array Architecture for Multi-Level NAND Flash Memories", Digest of Technical Papers, 1995 Symposium on VLSI Circuits, pp. 69-70, Jun. 8-10, 1995.
Takeuchi et al., "A Multipage Cell Architecture for High-Speed Programming Multilevel NAND Flash Memories", IEEE Journal of Solid State Circuits, vol. 33, No. 8, Aug. 1998.
UBUNTU Forums, "Memory Stick Failed IO Superblock", posted Nov. 11, 2009.
Wu et al., "eNVy: A non-Volatile, Main Memory Storage System", Proceedings of the 6th International Conference on Architectural support for programming languages and operating systems, pp. 86-87, San Jose, USA, 1994.
International Application PCT/IL2007/000575 Patentability report dated Mar. 26, 2009.
International Application PCT/IL2007/000575 Search Report dated May 30, 2008.
International Application PCT/IL2007/000576 Patentability Report dated Mar. 19, 2009.
International Application PCT/IL2007/000576 Search Report dated Jul. 7, 2008.
International Application PCT/IL2007/000579 Patentability report dated Mar. 10, 2009.
International Application PCT/IL2007/000579 Search report dated Jul. 3, 2008.
International Application PCT/IL2007/000580 Patentability Report dated Mar. 10, 2009.
International Application PCT/IL2007/000580 Search Report dated Sep. 11, 2008.
International Application PCT/IL2007/000581 Patentability Report dated Mar. 26, 2009.
International Application PCT/IL2007/000581 Search Report dated Aug. 25, 2008.
International Application PCT/IL2007/001059 Patentability report dated Apr. 19, 2009.
International Application PCT/IL2007/001059 Search report dated Aug. 7, 2008.
International Application PCT/IL2007/001315 search report dated Aug. 7, 2008.
International Application PCT/IL2007/001315 Patentability Report dated May 5, 2009.
International Application PCT/IL2007/001316 Search report dated Jul. 22, 2008.
International Application PCT/IL2007/001316 Patentability Report dated May 5, 2009.
International Application PCT/IL2007/001488 Search report dated Jun. 20, 2008.
International Application PCT/IL2008/000329 Search report dated Nov. 25, 2008.
International Application PCT/IL2008/000519 Search report dated Nov. 20, 2008.
International Application PCT/IL2008/001188 Search Report dated Jan. 28, 2009.
International Application PCT/IL2008/001356 Search Report dated Feb. 3, 2009.
International Application PCT/IL2008/001446 Search report dated Feb. 20, 2009.
U.S. Appl. No. 11/949,135 Official Action dated Oct. 2, 2009.
U.S. Appl. No. 12/019,011 Official Action dated Nov. 20, 2009.
U.S. Appl. No. 11/957,970 Official Action dated May 20, 2010.
U.S. Appl. No. 12/171,797 Official Action dated Aug. 25, 2010.
U.S. Appl. No. 11/945,575 Official Action dated Aug. 24, 2010.
U.S. Appl. No. 12/497,707 Official Action dated Sep. 15, 2010.
U.S. Appl. No. 11/995,801 Official Action dated Oct. 15, 2010.
U.S. Appl. No. 12/045,520 Official Action dated Nov. 16, 2010.
U.S. Appl. No. 12/388,528 Official Action dated Nov. 29, 2010.
U.S. Appl. No. 11/995,814 Official Action dated Dec. 17, 2010.
U.S. Appl. No. 12/251,471 Official Action dated Jan. 3, 2011.
U.S. Appl. No. 12/171,797, filed Jul. 11, 2008.
U.S. Appl. No. 12/251,471, filed Oct. 15, 2008.
U.S. Appl. No. 12/497,707, filed, Jul. 6, 2009.
U.S. Appl. No. 12/534,893, filed Aug. 4, 2009.
U.S. Appl. No. 12/534,898, filed Aug. 4, 2009.
U.S. Appl. No. 12/551,583, filed Sep. 1, 2009.
U.S. Appl. No. 12/551,567, filed Sep. 1, 2009.
U.S. Appl. No. 12/558,528, filed Sep. 13, 2009.
U.S. Appl. No. 12/579,430, filed Oct. 15, 2009.
U.S. Appl. No. 12/579,432, filed Oct. 15, 2009.
U.S. Appl. No. 12/607,078, filed Oct. 28, 2009.
U.S. Appl. No. 12/607,085, filed Oct. 28, 2009.
U.S. Appl. No. 12/649,358, filed Dec. 30, 2009.
U.S. Appl. No. 12/649,360, filed Dec. 30, 2009.
U.S. Appl. No. 12/688,883, filed Jan. 17, 2010.
U.S. Appl. No. 12/728,296, filed Mar. 22, 2010.
U.S. Appl. No. 12/758,003, filed Apr. 11, 2010.
U.S. Appl. No. 12/880,101, filed Sep. 12, 2010.
U.S. Appl. No. 12/890,724, filed Sep. 27, 2010.
U.S. Appl. No. 12/822,207, filed Jun. 24, 2010.
U.S. Appl. No. 12/987,174, filed Jan. 10, 2011.
U.S. Appl. No. 12/987,175, filed Jan. 10, 2011.
U.S. Appl. No. 12/963,649, filed Dec. 9, 2010.
U.S. Appl. No. 13/021,754, filed Feb. 6, 2011.
U.S. Appl. No. 12/534,898 Official Action dated Mar. 23, 2011.
U.S. Appl. No. 13/047,822, filed Mar. 15, 2011.
U.S. Appl. No. 13/088,361, filed Apr. 17, 2011.
US 7,161,836, 01/2007, Wan et al. (withdrawn).
Ankolekar et al., "Multibit Error-Correction Methods for Latency-Constrained Flash Memory Systems", IEEE Transactions on Device and Materials Reliability, vol. 10, No. 1, pp. 33-39, Mar. 2010.
U.S. Appl. No. 12/344,233 Official Action dated Jun. 24, 2011.
U.S. Appl. No. 11/995,813 Official Action dated Jun. 16, 2011.
Berman et al., "Mitigating Inter-Cell Coupling Effects in MLC NAND Flash via Constrained Coding", Flash Memory Summit, Santa Clara, USA, Aug. 19, 2010.
U.S. Appl. No. 12/178,318 Official Action dated May 31, 2011.
CN Patent Application # 200780026181.3 Official Action dated Apr. 8, 2011.
Wei, L., "Trellis-Coded Modulation With Multidimensional Constellations", IEEE Transactions on Information Theory, vol. IT-33, No. 4, pp. 483-501, Jul. 1987.
U.S. Appl. No. 13/114,049 Official Action dated Sep. 12, 2011.
U.S. Appl. No. 12/405,275 Official Action dated Jul. 29, 2011.
Conway et al., "Sphere Packings, Lattices and Groups", 3rd edition, chapter 4, pp. 94-135, Springer, New York, USA 1998.
Chinese Patent Application # 200780040493.X Official Action dated Jun. 15, 2011.

(56) References Cited

OTHER PUBLICATIONS

U.S. Appl. No. 12/037,487 Official Action dated Oct. 3, 2011.
U.S. Appl. No. 12/649,360 Official Action dated Aug. 9, 2011.
U.S. Appl. No. 13/192,504, filed Jul. 28, 2011.
U.S. Appl. No. 13/192,852, filed Aug. 2, 2011.
U.S. Appl. No. 13/231,963, filed Sep. 14, 2011.
U.S. Appl. No. 13/239,408, filed Sep. 22, 2011.
U.S. Appl. No. 13/239,411, filed Sep. 22, 2011.
U.S. Appl. No. 13/214,257, filed Aug. 22, 2011.
U.S. Appl. No. 13/192,501, filed Jul. 28, 2011.
U.S. Appl. No. 13/192,495, filed Jul. 28, 2011.

* cited by examiner

CACHE MEMORY FOR HYBRID DISK DRIVES

CROSS-REFERENCE TO RELATED APPLICATIONS

This application claims the benefit of U.S. Provisional Patent Application 61/367,894, filed Jul. 27, 2010, whose disclosure is incorporated herein by reference.

FIELD OF THE INVENTION

The present invention relates generally to data storage, and particularly to cache memories in data storage systems.

BACKGROUND OF THE INVENTION

Cache memories are used in various data storage applications. For example, some disk drives use a hybrid configuration in which a Non-Volatile Memory (NVM—e.g., Flash memory) is used as cache memory for a Hard disk Drive (HDD). Hong and Shin, for example, describe such hybrid configurations, in "NAND Flash-based Disk Cache Using SLC/MLC Combined Flash Memory," 2010 International Workshop on Storage Network Architecture and Parallel I/Os, May, 2010, which is incorporated herein by reference.

SUMMARY OF THE INVENTION

An embodiment of the present invention that is described herein provides a method for data storage in a data storage system that includes a main storage device and a non-volatile memory. The method includes assessing quality levels of respective memory blocks of the non-volatile memory. One or more of the memory blocks whose assessed quality levels are lower than a predefined quality threshold are identified. The identified memory blocks are assigned to serve as read cache memory. Data is read from the main storage device via the read cache memory, including the assigned memory blocks.

In some embodiments, the non-volatile memory is partitioned into at least the read cache memory and a write cache memory, and the method includes assigning at least one memory block whose assessed quality level is higher than the predefined quality threshold to the write cache memory. In a disclosed embodiment, assessing the quality levels includes assessing respective numbers of Programming and Erasure (P/E) cycles applied to the memory blocks, and identifying the memory blocks includes detecting the memory blocks whose numbers of P/E cycles are larger than a predefined number.

In another embodiment, assessing the quality levels includes extracting the quality levels from production test results that identify low-quality memory blocks. Extracting the quality levels may include identifying the memory blocks that are indicated by the test data as expected to endure less than a predefined number of P/E cycles.

In an embodiment, assessing the quality levels includes assessing respective programming times needed for programming the memory blocks, and identifying the memory blocks includes detecting the memory blocks whose programming times are smaller than a predefined time threshold. In another embodiment, assessing the quality levels includes assessing respective erasure times needed for erasing the memory blocks, and identifying the memory blocks includes detecting the memory blocks whose erasure times are longer than a predefined time threshold.

In yet another embodiment, assessing the quality levels includes assessing respective numbers of post-programming errors in the memory blocks, and identifying the memory blocks includes detecting the memory blocks whose numbers of post-programming errors are larger than a predefined number. Assessing the numbers of post-programming errors may include assessing a count of the post-programming errors in a given page belonging to a given memory block upon completing to program one or more subsequent pages in the given block. In still another embodiment, assessing the quality levels includes assessing respective numbers of errors in the memory blocks following a given retention period or temperature change, and identifying the memory blocks includes detecting the memory blocks whose numbers of errors are larger than a predefined number.

In some embodiments, the method includes storing the data in the memory blocks belonging to the read cache memory at a first storage density, and storing the data in the memory blocks that do not belong to the read cache memory at a second storage density that is smaller than the first storage density. The method may include setting the predefined threshold based on a criterion relating to a size of the read cache memory. In an embodiment, the main storage device includes a Hard Disk Drive (HDD) and the non-volatile memory includes a solid state memory device.

In another embodiment, assessing the quality levels includes reporting at least one of the assessed quality levels from a memory controller coupled to the non-volatile memory to a host, and assigning the identified memory blocks includes allocating the identified memory blocks to the read cache memory by the host based on the reported quality metrics, and indicating the memory blocks assigned to the read cache memory from the host to the memory controller.

There is additionally provided, in accordance with an embodiment of the present invention, apparatus including an interface and a processor. The interface is configured to communicate at least with a non-volatile memory. The processor is configured to assess quality levels of respective memory blocks of the non-volatile memory, to identify one or more of the memory blocks whose assessed quality levels are lower than a predefined quality threshold, and to assign the identified memory blocks to serve as read cache memory for readout from a main storage device.

There is also provided, in accordance with an embodiment of the present invention, a data storage apparatus including a main storage device, a non-volatile memory and a processor. The processor is configured to assess quality levels of respective memory blocks of the non-volatile memory, to identify one or more of the memory blocks whose assessed quality levels are lower than a predefined quality threshold, and to assign the identified memory blocks to serve as read cache memory for readout from the main storage device.

The present invention will be more fully understood from the following detailed description of the embodiments thereof, taken together with the drawings in which:

DETAILED DESCRIPTION OF EMBODIMENTS

Overview

Embodiments of the present invention that are described hereinbelow provide improved methods and devices for data caching in data storage systems. In some embodiments, a memory system comprises a main storage device, a non-volatile memory and a memory controller. The main storage device, such as a Hard Disk Drive (HDD), is used for long-term storage. The non-volatile memory comprises multiple memory blocks, at least some of which are used as a read cache memory for data items that are stored in the main storage device. The memory controller, amongst other tasks, selects which of the memory blocks of the non-volatile memory are to serve as the read cache memory.

In some disclosed embodiments, the memory controller identifies low-quality blocks and assigns them to the read cache memory. Low-quality memory blocks may comprise, for example, heavily-cycled memory blocks that have endured a high number of Programming and Erasure (P/E) cycles, or memory blocks that were identified as having low quality by a production screening process.

Since any data item that is cached in the read cache memory is also stored in the main storage device, failure to read a data item from the read cache memory would not cause data loss. Such a failure would only cause temporary delay because of the need to fetch the data item in question from the main storage device. Therefore, assigning low-quality blocks to serve as read cache memory causes little or no degradation in readout performance.

On the other hand, this sort of assignment provides considerable advantages. For example, some of the memory blocks assigned to the read cache memory may not be usable for other purposes because of their low quality, and would otherwise be wasted. Therefore, the disclosed techniques enable a more efficient use of the non-volatile memory. Moreover, when using the disclosed assignment schemes, memory blocks assigned to purposes other than read cache (e.g., write cache) typically have a higher quality, on average. As a result, system performance (e.g., write caching performance) is improved.

The disclosed techniques can be used, for example, in hybrid disk drives in which the main storage device comprises a HDD and the non-volatile memory comprises a solid state memory such as Flash. In alternative embodiments, the disclosed techniques can be used in Solid State Drives (SSD) in which both the main storage device and the non-volatile memory comprise solid state memory.

System Description

Figure 1:
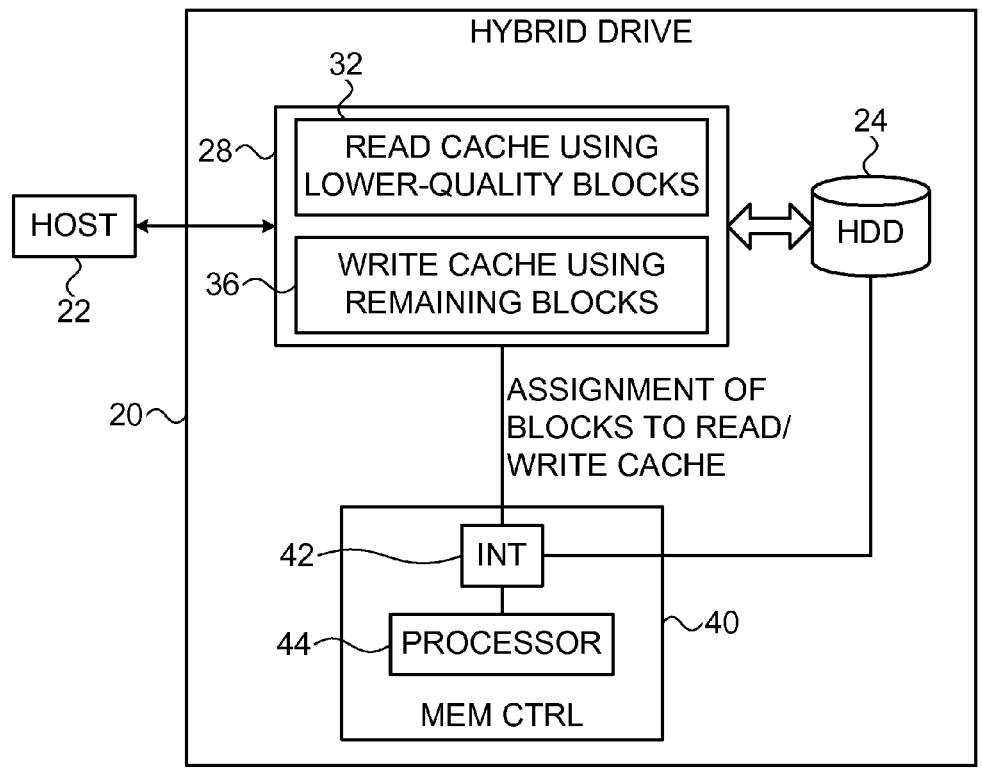
FIG. 1 is a block diagram that schematically illustrates a hybrid disk drive, in accordance with an embodiment of the present invention.

FIG. 1 is a block diagram that schematically illustrates a hybrid disk drive 20, in accordance with an embodiment of the present invention. Disk drive 20 stores data on behalf of a host 22. For example, drive 20 may be installed in a personal computer, in a mobile computing and/or communication device, in an enterprise data center or in any other suitable type of host system.

Hybrid drive 20 comprises a main storage device, in the present example a Hard Disk Drive (HDD) 24, which is used for long-term storage of data items that are accepted from host 22. In addition, drive 20 comprises a solid state Non-Volatile Memory (NVM) 28, in the present example one or more Flash memory devices. NVM 28 is used as a cache memory for temporary caching of data items that are read from and written to HDD 24.

The term "main storage device" typically refers to the largest memory that is used by the host for storage of data. In some embodiments the main storage device is used for long-term storage, as opposed to interim storage or buffering. Typically, the host stores and retrieves data items by specifying storage addresses for the data items in an address space of the main storage device. The term "cache memory" refers to a memory that is used for storage of frequently accessed data, in order to improve the storage and/or retrieval performance. The data stored in the cache memory may be stored in the main storage device as well.

The performance improvement is typically achieved by using cache memories having faster access time in comparison with the main storage device. For example, a read cache memory typically holds data items that have been retrieved in the past from the main storage device, so that if and when these data items are requested again, they can be read from the (faster) read cache memory instead of the (slower) main storage device. A write cache memory typically holds data items that are en-route from the host to the main storage device, for example frequently-written data items. A write cache memory increases storage speed, since write operations can be acknowledged once the data items are stored successfully in the write cache memory. Typically, the host is unaware of the storage addresses of cache memories.

Typically, NVM 28 comprises multiple memory blocks, and each memory block comprises multiple memory cells. The various memory blocks of NVM 28 may be assigned to serve different functions. In some embodiments, a certain subset of the memory blocks is assigned to serve as a read cache memory 32, and another subset of the memory blocks is assigned to serve as a write cache memory 36. Each of these subsets does not necessarily occupy contiguous memory addresses. Example criteria for assigning memory blocks to read cache memory 32 and write cache memory 36 is described below.

Drive 20 comprises a memory controller 40, which manages and controls the various elements of the hybrid drive. Memory controller 40 comprises an interface for communicating with HDD 24 and NVM 28, and a processor 44 that carries out the methods described herein. As will be explained in detail below, processor 44 of memory controller 40 selects and assigns memory blocks of NVM 28 to serve various functions, such as read cache memory 32 and write cache memory 36.

In a typical readout process, memory controller 40 of drive 20 is requested by host 22 to retrieve a certain data item that is stored in HDD 24. In response to the request, the memory controller first checks whether the requested data item is cached in read cache memory 32 (whose access time is typically much faster than that of HDD 24). If the data item is cached, the memory controller reads the data item from the read cache memory and sends it to the host without involving the HDD. Otherwise, the memory controller reads the data item from the HDD and sends it to the host. The memory controller may apply any suitable criteria as to whether to add, retain or discard data items in the read cache memory. Note, however, that any data item that is cached in read cache memory 32 is also stored in HDD 24.

In a typical writing process, memory controller 40 receives from host 22 a data item for storage in HDD 24. The memory controller initially caches the data item in write cache memory 36 (whose access time is typically much faster than that of HDD 24) and sends an acknowledgement to the host. At a later time, the memory controller may copy the data item from write cache memory 36 for long-term storage in HDD 24. The memory controller may apply any suitable criteria as to whether to add, retain or discard data items in the write cache memory.

In a typical hybrid drive, the capacity of HDD 24 is on the order of 500-1000 GB, the capacity of read cache memory 32 is on the order of ~12 GB, and the capacity of write cache memory 36 is on the order of ~4 GB. A typical memory block size in NVM 28 is on the order of ~2 MB. These values, however, are given purely by way of example, and any other suitable values may be used.

The configuration of hybrid drive 20 shown in FIG. 1 is an example configuration, which is chosen purely for the sake of conceptual clarity. Elements that are not necessary for understanding the principles of the present invention have been omitted from the figure for clarity. In alternative embodiments, any other suitable configuration can be used. For example, the main storage device may comprise any other suitable storage medium, such as a Flash-based Solid State Drive (SSD). In one embodiment, main storage device 24 and NVM 28 are implemented using the same memory media, for example by assigning certain address ranges in a SSD to serve as cache memories.

NVM 28 may comprise various other storage media, such as, for example, NAND, NOR or Charge Trap Flash (CTF) Flash memory, phase change RAM (PRAM, also referred to as Phase Change Memory—PCM), Nitride Read Only Memory (NROM), Ferroelectric RAM (FRAM), magnetic RAM (MRAM) and/or battery-backed Dynamic RAM (DRAM). In some embodiments the NVM comprises a read cache but not a write cache. NVM 28 may be used for various functions other than caching, such as for storing software code or system parameters.

In the example configuration of FIG. 1, memory controller 40 and NVM 28 are implemented as two separate Integrated Circuits (ICs). In alternative embodiments, however, the memory controller and NVM may be integrated on separate semiconductor dies in a single Multi-Chip Package (MCP) or System on Chip (SoC), and may be interconnected by an internal bus. Further alternatively, some or all of the memory controller circuitry may reside on the same die on which the NVM is disposed.

Further alternatively, some or all of the functionality of the memory controller can be implemented in software and carried out by a processor or other element of the host system, e.g., by host 22. In some embodiments, host 22 and memory controller 40 may be fabricated on the same die, or on separate dies in the same device package. In an example embodiment, memory controller 40 and NVM 28 are fabricated on a motherboard of the host system (e.g., mobile computer), separately from the HDD.

In some embodiments, memory controller 40 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory, or stored in NVM 28.

Assigning Lower-Quality Memory Blocks to Serve as Read Cache

In some embodiments, memory controller 40 assigns memory blocks in NVM 28 to read cache memory 32 based on the respective quality levels of the memory blocks. Typically, the memory controller identifies lower-quality blocks and assigns them to the read cache memory. The remaining memory blocks are assigned to other functions, such as to write cache memory 36.

This sort of assignment may increase the likelihood of failing to read data items from the read cache memory. Such failures, however, are usually tolerable, since any data item that is cached in read cache memory 32 is also stored in HDD 24. In the event that memory controller 40 fails to read a requested data item from the read cache memory, the memory controller reverts to read this data item from HDD 24 at the expense of a certain access time penalty.

On the other hand, assigning lower-quality memory blocks to the read cache memory improves the overall performance of drive 20. For example, some of the lower-quality memory blocks may not be usable for other purposes. If these memory blocks were not assigned to the read cache memory, they would have typically been declared bad blocks and discarded from use. Assigning such blocks to the read cache memory thus frees additional memory resources for other functions, e.g., for increasing the size of the write cache memory.

Furthermore, since the lower-quality memory blocks are assigned to the read cache memory, the memory blocks assigned to other functions (e.g., to the write cache memory) have, on average, a higher quality. As a result, system performance (e.g., write caching performance) is improved.

In the context of the present patent application and in the claims, the term "quality level" refers to any measure that is indicative of the expected storage quality of a given memory block. The quality level may be indicative, for example, of the expected storage reliability of the memory block, e.g., the expected likelihood of read errors in the block. Additionally or alternatively, the quality level may be indicative of the expected achievable storage capacity of the memory block, e.g., the number of bits or the number of bits/cell that can be stored in the memory cells of the memory block. In some types of NVM, the physical storage media of the memory cells deteriorate with use. Thus, in some embodiments the quality level of a memory block is indicative of the wear level of its physical storage media.

Memory controller 40 may assess the quality levels of the memory blocks of NVM 28 in various ways. In an example embodiment, the memory controller tracks or estimates the number of Programming and Erasure (P/E) cycles applied to each memory block. These numbers are indicative of the extent to which the memory blocks were used, and are therefore used by the memory controller as quality levels of the memory blocks.

In another embodiment, memory controller 40 has access to test data, e.g., production screening test data, of NVM 28. The test results typically indicate respective test results for each memory block. The memory controller extracts the quality level of each memory block from the test data. In one example embodiment, the test data indicate memory blocks that were found during production testing to have low expected endurance (e.g., memory blocks that are expected to endure less than a certain number of P/E cycles). The memory controller may use these indications as quality levels.

In yet another embodiment, memory controller 40 assesses the time needed to program the memory cells in the various memory blocks. For example, when the memory cells are programmed using an iterative Programming and Verification (P&V) process, the memory controller may assess the average number of P&V iterations needed for programming the various blocks. Typically, lower-quality memory cells are characterized by shorter programming times, and vice versa. In this embodiment, the memory controller regards the programming times of the various memory blocks as quality levels. Memory blocks exhibiting relatively short programming times (e.g., times shorter than a predefined threshold value) are regarded by the controller as low-quality blocks.

In still another embodiment, memory controller 40 assesses the time needed to erase the various memory blocks. Typically, lower-quality memory cells are characterized by longer erasure time, and vice versa. In this embodiment, the memory controller regards the erasure times of the various memory blocks as quality levels. Memory blocks exhibiting relatively long erasure times (e.g., times longer than a predefined threshold value) are regarded by the controller as low-quality blocks.

As yet another example, memory controller 40 may assess the number of post-programming errors in the various memory blocks. For example, the memory controller may read one or more pages from a given block shortly after programming (or use the read results of the last verification operation), and count the number of read errors in these pages. In this embodiment, the memory controller regards the number of post-programming errors in the various memory blocks as quality levels. Memory blocks exhibiting relatively large numbers of post-programming errors (e.g., numbers that exceed a predefined threshold value) are regarded by the controller as low-quality blocks.

In some embodiments, the memory controller assesses the number of post-programming errors in a given page upon completing to program this page, and before programming subsequent pages. Alternatively, however, the memory controller may assess the number of post-programming errors in a given page upon completing to program one or more subsequent pages in the same block (e.g., upon completing to program the entire word line to which the page belongs, the next word line, or the entire block to which the page belongs). These delayed assessment times enable the memory controller to observe impairments (e.g., program disturb) caused to the page by subsequent programming of the block.

In another alternative embodiment, the memory controller assesses the number of errors in the various memory blocks following a certain retention time and/or temperature change. These error counts are regarded as quality levels. Memory blocks that accumulate a large number of errors (e.g., larger than a predefined threshold value) during a certain retention period and/or over a certain temperature change are regarded as low-quality blocks. Additionally or alternatively, memory controller 40 may assess the quality levels of the memory cells using any other suitable method or criterion.

Typically, the memory controller compares the assessed quality levels of the memory blocks to some predefined quality threshold. Memory blocks whose quality level is lower than the threshold are classified as having low quality and assigned to the read cache memory. Memory blocks whose quality level exceeds the threshold are classified as having high quality and assigned to other functions, e.g., to the write cache memory.

The memory controller may set the quality threshold at various levels, and may modify the quality threshold over time. By setting the quality threshold, the memory controller is able to control the size of read cache memory 32, and to apply various trade-offs between this size and the sizes of other memory allocations, e.g., the size of write cache memory 36. In general, the memory controller may set the quality threshold based on any suitable criterion relating to the size of the read cache memory.

For example, the memory controller may decide that the capacity of NVM 28 is to be divided at a certain ratio between read cache memory 32 and write cache memory 36 (e.g., a 1:1 ratio or any other suitable ratio). The memory controller can derive the quality threshold that would achieve the desired ratio. As another example, the memory controller may decide that the size of read cache 32 should be of a certain size, and set the quality level so as to reach this size. In other words, the memory controller may set the quality threshold such that a certain desired percentage of the memory blocks, or a certain desired number of memory blocks, will fall below the threshold and will be regarded as low-quality memory blocks.

In some embodiments, memory controller 40 stores data in read cache memory 32 at a higher density than the density used for other functions of NVM 28. Higher density typically corresponds to higher error probability, but the increase in error probability is usually tolerable in the read cache memory, as explained above. In some embodiments, the memory controller stores data in the memory blocks of the read cache memory using a certain number of programming states (certain number of bits/cell), and in the other memory blocks using a smaller number of programming sates (fewer bits/cell).

Cache Configuration Method Description

Figure 2:
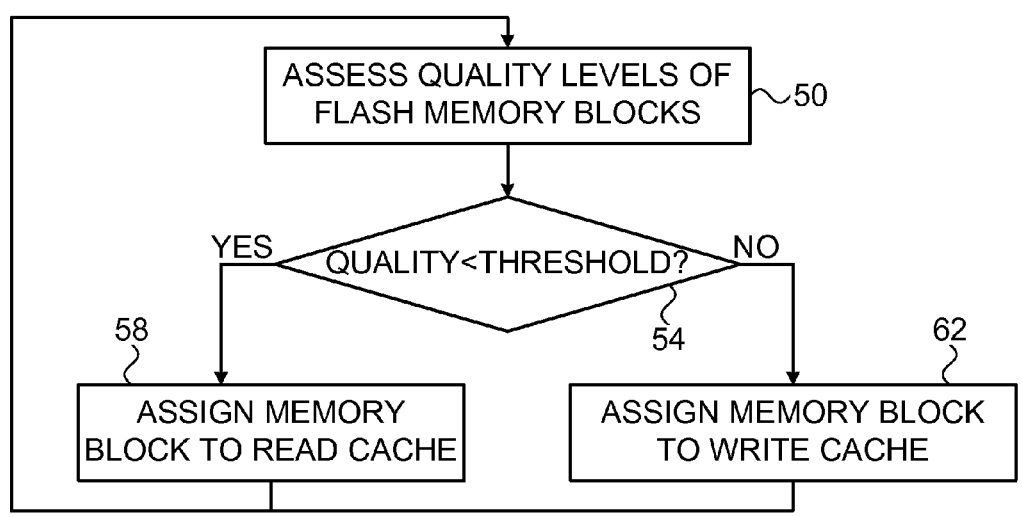
FIG. 2 is a flow chart that schematically illustrates a method for configuring read and write cache memory in a hybrid disk drive, in accordance with an embodiment of the present invention.

FIG. 2 is a flow chart that schematically illustrates a method for configuring read cache memory 32 and write cache memory 36 in hybrid disk drive 20, in accordance with an embodiment of the present invention. The method begins with memory controller 40 assessing the quality levels of memory blocks in NVM 28, at a quality assessment step 50. The memory controller compares the assessed quality levels to a quality threshold, at a comparison step 54. Memory blocks whose assessed quality levels are below the quality threshold are assigned by memory controller 40 to read cache memory 32, at a read cache assignment step 58. Memory blocks whose assessed quality levels meet or exceed the quality threshold are assigned by the memory controller to write cache memory 36, at a write cache assignment step 62. In subsequent read operations, the memory controller uses the read cache memory including the assigned memory blocks.

The method then loops back to step 50 above. The memory controller may run this block assignment process continually, periodically or in response to some event, e.g., when modifying the quality threshold or in order to account for changes in block quality levels that occur over time.

As noted above, some or all of the functionality of memory controller 40 may be implemented in host 22. In one example embodiment, the memory controller reports to the host which memory blocks of NVM 28 have low quality levels, e.g., over a suitable host interface. The host selects and assigns memory blocks to read cache memory 32 based on the reported quality levels.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data storage, comprising:
in a data storage system that includes a main storage device and a non-volatile memory, assessing a respective quality level of each memory block of a plurality of memory blocks of the non-volatile memory;
identifying a first subset of memory blocks of the plurality of memory blocks, wherein the quality level of each memory block of the first subset of memory blocks is less than a predefined quality threshold;
adjusting the predefined quality threshold to generate an updated quality threshold, wherein a second number of memory blocks included in a second subset of memory blocks of the plurality of memory blocks is different than a first number of memory blocks included in the first subset of memory blocks, and wherein each memory block included in the second subset of memory blocks has an assessed quality level less than the updated quality threshold;
assigning the second subset of memory blocks to serve as read cache memory; and
reading data from the main storage device via the read cache memory, including the assigned memory blocks;
wherein assessing the respective quality level of each memory block of the plurality of memory blocks in the non-volatile memory includes determining a respective number of post-programming errors in each memory block;
wherein the predefined quality threshold corresponds to a number of post-programming errors in a given memory block; and
wherein determining the respective number of post-programming errors in each memory block includes determining the respective number of post-programming errors in each memory block responsive to a determination that a period of time has elapsed since a first group of memory cells in each memory block has been programmed prior to programming a second group of memory cells in each memory block, and responsive to a determination that a temperature change has occurred since the first group of memory cells in each memory block has been programmed.

2. The method according to claim 1, wherein the non-volatile memory is partitioned into at least the read cache memory and a write cache memory, and further comprising assigning at least one memory block of the plurality of memory blocks whose assessed quality level is greater than the updated quality threshold to the write cache memory.

3. The method according to claim 1, and comprising storing the data in the memory blocks belonging to the read cache memory at a first storage density, and storing the data in the memory blocks that do not belong to the read cache memory at a second storage density that is smaller than the first storage density.

4. The method according to claim 1, wherein the main storage device comprises a Hard Disk Drive (HDD) and wherein the non-volatile memory comprises a solid state memory device.

5. The method according to claim 1, wherein assessing the respective quality level comprises reporting the quality level of at least one memory block of the plurality of memory blocks from a memory controller coupled to the non-volatile memory to a host, and wherein assigning the second subset of memory blocks comprises allocating the second subset of memory blocks to the read cache memory by the host based on the reported quality level of the at least one memory block, and indicating the memory blocks assigned to the read cache memory from the host to the memory controller.

6. An apparatus, comprising:
an interface for communicating at least with a non-volatile memory; and
a processor, configured to:
assess a respective quality level of each memory block of a plurality of memory blocks of the non-volatile memory;
identify a first subset of memory blocks of the plurality of memory blocks, wherein the quality level of each memory block of the first subset of memory blocks is less than a predefined quality threshold;
adjust the predefined quality threshold to generate an updated quality threshold, wherein a second number of memory blocks included in a second subset of memory blocks of the plurality of memory blocks is different than a first number of memory blocks included in the first subset of memory blocks, and wherein each memory block included in the second subset of memory blocks has an assessed quality level less than the updated quality threshold; and
assign the second subset of memory blocks to serve as read cache memory for readout from a main storage device;
wherein to assess the respective quality level of each memory block in the non-volatile memory, the processor is further configured to determine a respective number of post-programming errors of each memory block;
wherein the predefined quality threshold corresponds to a number of post-programming errors in a given memory block; and
wherein to determine the respective number of post-programming errors in each memory block, the processor is further configured to determine the respective number of post-programming errors in each memory block responsive to a determination that a period of time has elapsed since a first group of memory cells in each memory block has been programmed prior to programming a second group of memory cells in each memory block, and responsive to a determination that a temperature change has occurred since the first group of memory cells in each memory block has been programmed.

7. The apparatus according to claim 6, wherein the non-volatile memory is partitioned into at least the read cache memory and a write cache memory, and wherein the processor is configured to assign at least one memory block of the plurality of memory blocks whose assessed quality level is greater than the updated quality threshold to the write cache memory.

8. The apparatus according to claim 6, wherein the processor is configured to extract the quality levels from production test results that identify low-quality memory blocks.

9. The apparatus according to claim 8, wherein the processor is configured to extract the quality levels by identifying the memory blocks that are indicated by the test data as expected to endure less than a predefined number of Programming and Erasure (P/E) cycles.

10. The apparatus according to claim 6, wherein the processor is configured to store the data in the memory blocks belonging to the read cache memory at a first storage density, and to store the data in the memory blocks that do not belong to the read cache memory at a second storage density that is smaller than the first storage density.

11. The apparatus according to claim 6, wherein the main storage device comprises a Hard Disk Drive (HDD) and wherein the non-volatile memory comprises a solid state memory device.

12. The apparatus according to claim 6, wherein the processor comprises:
  a memory controller, which is coupled to the non-volatile memory and is configured to assess the respective quality level of each memory block of the plurality of memory blocks and to report the quality level of at least one memory block of the plurality of memory blocks over a host interface; and
  a host, which is configured to allocate the second subset of memory blocks to the read cache memory based on the quality level of the at least one memory block reported by the memory controller, and to indicate the second subset of memory blocks assigned to the read cache memory to the memory controller.

13. A data storage apparatus, comprising:
  a main storage device;
  a non-volatile memory; and
  a processor, configured to:
    assess a respective quality level of each memory block of a plurality of memory blocks of the non-volatile memory;
    identify a first subset of memory blocks of the plurality of memory blocks, wherein the quality level of each memory block of the first subset of memory blocks is less than a predefined quality threshold;
    adjust the predefined quality threshold to generate an updated quality threshold, wherein a second number of memory blocks included in a second subset of memory blocks of the plurality of memory blocks is different than a first number of memory blocks included in the first subset of memory blocks, and wherein each memory block included in the second subset of memory blocks has an assessed quality level less than the updated quality threshold; and
    assign the second subset of memory blocks to serve as read cache memory for readout from the main storage device;
    wherein to assess the respective quality level of each memory block in the non-volatile memory, the processor is further configured to determine a respective number of post-programming errors of each memory block;
    wherein the predefined quality threshold corresponds to a number of post-programming errors in a given memory block; and
    wherein to determine the respective number of post-programming errors in each memory block, the processor is further configured to determine the respective number of post-programming errors in each memory block responsive to a determination that a period of time has elapsed since a first group of memory cells in each memory block has been programmed prior to programming a second group of memory cells in each memory block, and responsive to a determination that a temperature change has occurred since the first group of memory cells in each memory block has been programmed.

* * * * *